United States Patent [19]

Cossé

[11] Patent Number: 4,502,376
[45] Date of Patent: Mar. 5, 1985

[54] MACHINE FOR MAKING COATED PRODUCTS SUCH AS BISCUITS OR COOKIES

[75] Inventor: Lionel Cossé, Nantes, France

[73] Assignee: Biscuiterie Nantaise—BN, Nantes, France

[21] Appl. No.: 412,922

[22] Filed: Aug. 30, 1982

[30] Foreign Application Priority Data

Dec. 16, 1981 [FR] France .................. 81 23788

[51] Int. Cl.³ .......................... A21C 9/04; B29F 3/01; B29F 3/04
[52] U.S. Cl. .................. 99/450.4; 99/450.7; 425/376 B
[58] Field of Search ............ 99/450.1–450.8; 425/381, 310, 382 R, 376 B; 118/25, 301, 313; 137/625.11, 625.16; 251/207, 208, 304, 345; 222/485, 486, 553, 554

[56] References Cited

U.S. PATENT DOCUMENTS

| | | | |
|---|---|---|---|
| 2,993,453 | 7/1961 | Fay | 99/450.7 |
| 3,340,824 | 9/1967 | Talbot | 425/382 X |
| 4,162,882 | 7/1979 | Rose | 99/450.4 |

Primary Examiner—Timothy F. Simone

Attorney, Agent, or Firm—Frost & Jacobs

[57] ABSTRACT

A sandwiching machine is disclosed providing equal filler flow rates to nozzles in a rotational stencil and regular flow regardless of the speed of displacement of an associated conveyor passing by upstream and downstream cookie supply stations and a filler depositing station therebetween, the filler flow rate being regulated as a function of the speed of diplacement of the conveyor. The machine provides synchronization of the rotational speed of the rotational drives for the conveyor chains by means of a mechanical connection comprising clutches associated with a speed change device. The pressure of filler at the admission sides of volumetric pumps is maintained constant by means of a pressure regulator and accumulator. The feeding of the stencil cylinder is effected through two separate inlets. One inlet feeds filler into a hollow shaft fixed to the body of a valve member through a radial channel for communication through ports in the stencil cylinder with orifices in the rotational stencil. The other inlet carries filler into the delivery box at one end of the stencil cylinder between the latter and the hollow shaft. The ports may be selectively closed off by angular movement of the valve member.

12 Claims, 6 Drawing Figures

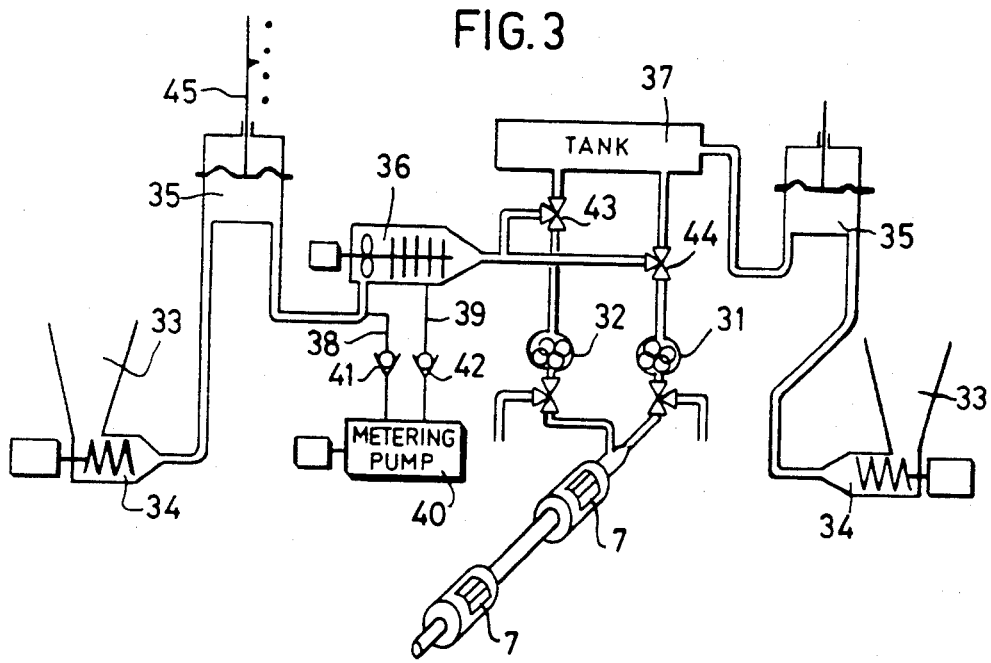
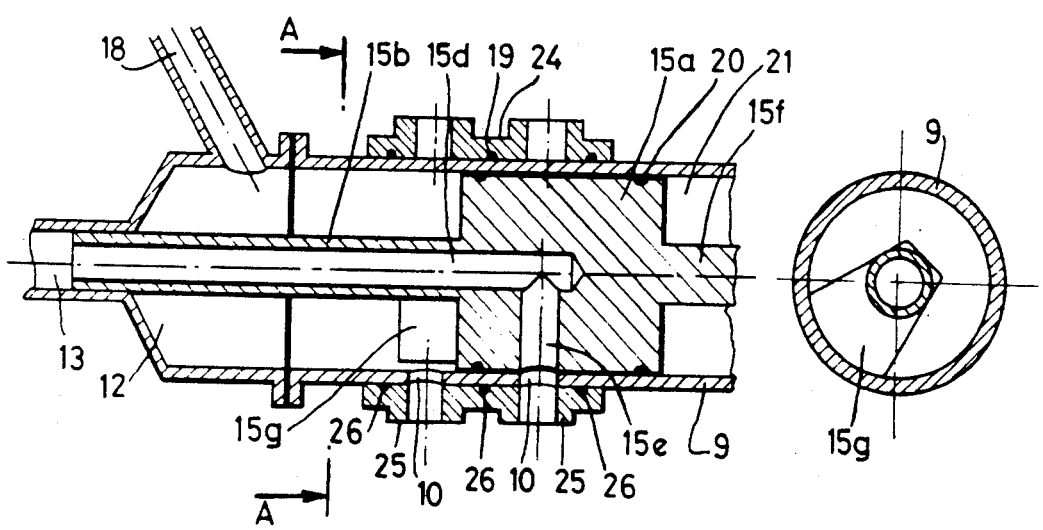

MACHINE FOR MAKING COATED PRODUCTS SUCH AS BISCUITS OR COOKIES

The present invention relates to machines for making coated products, and more particularly so-called sandwiching machines in which a layer of creme, chocolate or jam is provided between two baked pastry elements, such as biscuits or cookies, hereinafter referred to as cookies.

Known sandwiching machines generally comprise a cookie supply station for delivering the bottom cookie of the sandwich on a conveyor. This first cookie supply station is located upstream of a rotatable filler depositing station having an axis perpendicular to the direction of displacement of the conveyor and disposed thereabove. The filler depositing station comprises a feed inlet of creme, jam or chocolate, which for the sake of simplification, will be referred to as filler and stencil ports which pass above the bottom cookies, the creme depositing station usually being designed to handle two parallel conveyors carrying bottom cookies. A second cookie supply station delivers on each cookie on which a layer of filler has been deposited a second cookie defining the top of the sandwich.

The speed of displacement of the cookies on the conveyor and the small space between the various work stations require a perfectly uniform feed at the upstream and downstream stations, the cookies having to be fed from above the conveyor in a horizontal position and at the desired rate. Temporarily insufficient feeding may cause the cookies to be in a position detrimental to their proper delivery. Excessive jamming, or packing, may also damage a number of cookies. Nonuniform delivery may translate into a shift in the position of the coated cookie with respect to a cookie to be coated and a shift in the position of the top and bottom of a sandwich to be formed.

Another difficulty resides in the regularity in depositing the filler. The difficulty arise mainly from the fact that the filler may vary in consistency due to changes in temperature for example. It is therefore indispensable to obtain uniform metering of the amount of filler deposited on each bottom cookie. The daily operating periods of such a machine and the increasingly elevated production rates do not admit of any defective operation of the filler depositing station.

Present-day sandwiching machines all comprise a single filler feed for the rotatable filler depositing station, which is generally along the axis of fixed stencil cylinder having ports arranged along a generatrix of the cylinder and spaced a distance corresponding to distance between rows of cookies on the conveyor. Concentrically to this stencil cylinder is a rotatable stencil having uniformly radially spaced groups of orifices arranged along generatrices spaced from one another at distances corresponding to those of the stencil ports. A valve member arranged coaxially of the stencil cylinder and the rotatable stencil permits by limited magnitude rotation the closing off of the ports in the stencil cylinder in order to stop the depositing of filler once any misfunction appears in this operation.

Such a machine is disclosed in U.K. Pat. No. 887.710 In that machine the filler entering one of the ends of the stencil cylinder must theoretically be delivered at the same flow rate to each of the ports in the stencil cylinder. In actual fact their series relation does not ensure equal flow rates, but there is a higher flow rate established at the port closer to the end of the stencil cylinder from which the filler is fed.

To remedy this shortcoming Talbot U.S. Pat. No. 3,340,824 discloses a filler proportioning means between the ports of the stencil cylinder incorporated in the valve member. The proportioning means channels the filler to the ports through an annular space located approximately midway therefrom, the flow of filler from the annular space being divided into two streams of semicircular section each running to one of the ports. Such an arrangement does not ensure the sought-after equal flows, a predominant flow is established at the port remote from the feed end of the stencil cylinder, as the filler flow intended for the port adjacent the feed end of the stencil cylinder is effected countercurrent.

Finally, in Rose U.S. Pat. No. 4,162,882 there is disclosed an improvement in the valve member intended to obtain an appertioning of the flow of filler proportional to the distance between the ports in the stencil cylinder and the inlet orifice at the end of the stencil cylinder. The actual valve member which is in the form of a segment of a cylinder has a cut-away portion providing priority for the port remote from the cylinder filler inlet putting it progressively into communication with the corresponding ports in the rotational stencil while the adjacent port in the stencil cylinder is still closed. This arrangement permits the desired equalization between the open and closed positions of the valve member. Such machines, owing to the reasons brought out above, cannot give satisfaction at high rates of production.

The machine according to the invention enables these shortcomings to be overcome. With the present machine it is possible to obtain equalized filler flow rates to each of the ports in the rotational stencil as well as uniformity of these flow rates irrespective of the displacement speed of the cookies at the filler depositing station, the flow rate being regulated as a function of the translatory speed of the conveyor.

According to the invention there is provided a machine for preparing coated products such as cookies or biscuits with a layer of filler thereon, the machine comprising conveyors each serving in order an upstream station for supplying bottom elements, a filler depositing station, and optionally a downstream station for supplying top elements, the filler depositing station comprising a fixed stencil cylinder having stencil ports, a valve member coaxially received in the stencil cylinder, a pneumatic cylinder for imparting limited magnitude angular movements to the valve member for controlling the same, the pneumatic cylinder being responsive to the starting and stopping of the machine, the valve member selectively closing off the ports in the stencil cylinder and bringing them into communication with orifices or nozzles in a rotational stencil surrounding the stencil cylinder the orifices or nozzles in the rotational stencil being brought into registry with the corresponding ports in the stencil cylinder in the course of rotation of the rotational stencil, the machine being characterized by two independent filler feed inlets for providing equal filler flow rates to the orifices or nozzles in the rotational stencil, volumetric pumps for supplying filler to the filler feed inlets, means for synchronizing the volumetric pumps with rotational drive means for conveyors to ensure regular filler flow rates to provide uniform thickness of the layer of filler deposited whatever the speed of displacement of the conveyors, the synchronizing means permitting, on starting the machine, the operation of only the volumetric pumps until a proper flow of filler is established at the orifices or nozzles in the rotational stencil and thereafter displacing the bottom elements to the filler depositing stations, the synchronizing means adjusting, in normal operation of the machine, the ratio between the filler flow rate and the speed of displacement of the conveyors, and means for regulating the supply of filler to the admission sides of the volumetric pumps for maintaining the pressure constant thereat.

Preferably, there are as many conveyors on the same frame as there are rows of cookies on which filler is to be deposited. Preferably, the conveyors are chain conveyors with dogs. Also, the fixed stencil cylinder is supported at its ends by bearing surfaces fixed to the frame. The number of ports along a generatrix on the stencil cylinder is equal to the number of rows of cookies on which filler is to be deposited, the space between the ports corresponding to the spacing of the rows of cookies.

Preferably, one end of the stencil cylinder is limited by a filler delivery box, the valve member comprising a body having an axial bore connected to a radial channel which communicates with the port in the stencil cylinder remote from the delivery box when the valve member is in its open position the size and shape of the cross section of the radial channel being the same as that of the port remote from the delivery box, the body of the valve member being extending to the delivery box side by a hollow shaft communicating with the axial bore in the body and with one of the filler feed inlets.

Preferably, the other filler feed inlet opens into the annular space included between the bore of the stencil cylinder and the follow shaft extending from the body of the valve member, the annular space communicating with the port in the stencil adjacent the delivery box. Also, a seal is provided on the body of the valve member for preventing communication between the ports in the stencil cylinder. Further, the delivery box forms a bearing for the hollow shaft on the valve member, the bearing being connected to the first filler feed inlets, a seal being provided between the bearing and the hollow shaft.

Preferably, a cylindrical segment is provided on the body of the valve member to the delivery box side thereof, the circumferential length of the cylindrical segment being selected such that the cylindrical segment closes off the port adjacent the delivery box in a predetermined angular position of the valve member.

Preferably, the means for regulating the supply of filler to the admission side of the volumetric pumps comprises for each volumetric pump, a pressure regulator having a membrane and operating as a pressure accumulator, the pressure regulator being disposed between a discharge pump associated with a hopper and the volumetric pump, means mounted for movement with the membrane of the pressure regulator selectively for controlling the speed of the discharge pump stopping the discharge pump and stopping the volumetric pump.

Preferably, the means mounted for movement with the membrane comprises a sliding rod fixed to the membrane and carrying a cursor responsive to deformation of the membrane for actuating contacts electrically connected to the discharge pump and volumetric pumps, magnetic means for maintaining the contacts closed during translation of the rod beyond the contact making point, and thereafter breaking contact with a reversal of direction of translation of the rod.

Finally, the means for regulating the supply of filler to the admission side of the associated volumetric pump further comprises a tank for constantly force feeding filler to the volumetric pumps, the tank being disposed between the pressure regulators and the volumetric pumps.

The attached drawings illustrate, by way of example, am embodiment of the machine in conformity with the invention. A brief description of the drawings follows:

FIG. 3 is a schematic diagram of the control system for supplying filler to the pumps;

FIG. 4 is a diagrammatic longitudinal sectional view of the filler depositing station;

FIG. 5 is a transverse sectional view taken along line A—A in FIG. 4, with the rotational stencil removed.

Figure 2:
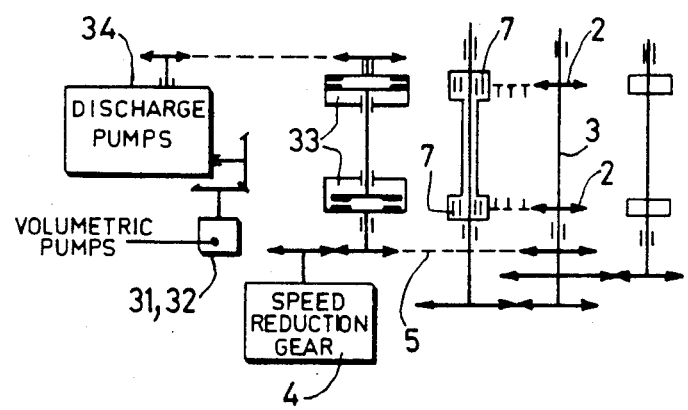
FIG. 2 is a schematic view of the kinematic chain of the machine, illustrating the means for synchronizing the rotational drive of the volumetric pumps with the rotational drive of the chains of the conveyor.
Figure 1:
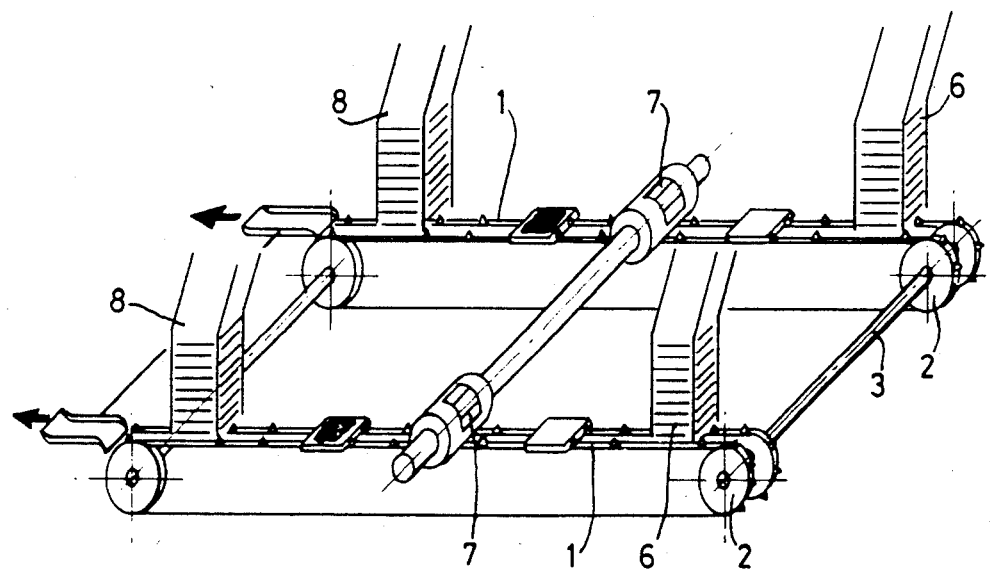
FIG. 1 is a diagrammatic perspective view of the entire machine.
Figure 6:
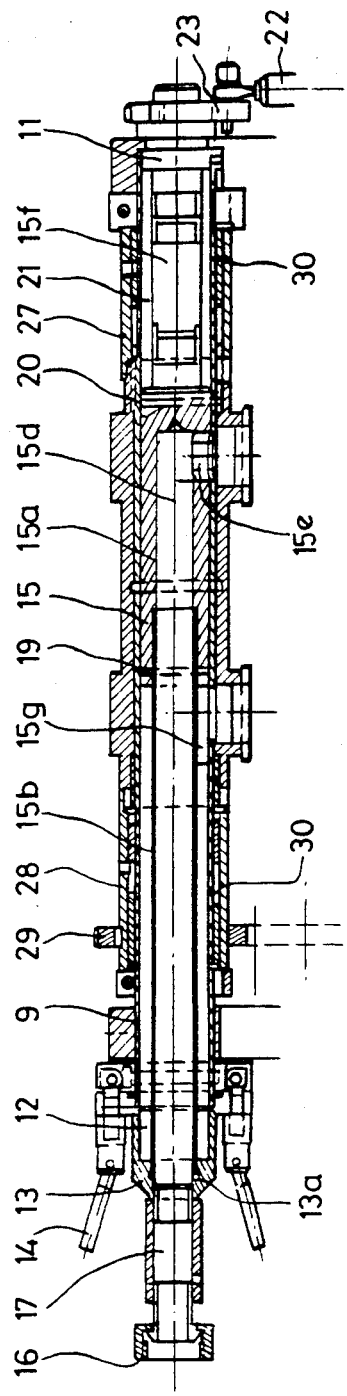
FIG. 6 is a longitudinal sectional view of the entire filler depositing station.

As shown in FIGS. 1 and 2, the machine comprises two chain conveyors each having two parallel chains 1 with dogs, driven by means of sprockets fixed for rotation with a shaft 3 rotatably driven by speed reduction gear 4 through a transmission chain 5. Each of the conveyors serving in consecutive order an upstream cookie supply station 6, a filler depositing station 7 and a downstream cookie supply station 8. The supply stations 7, 9, are equipped with devices permittng the automatic transfer of cookies in rows and comprising for this purpose an upstream dispensing apparatus supplying cookies with a constant degree of packing and at an adjustable speed. The cookies are carried by a descending chute to the conveyor chains 1. The chute is extended downwardly by a rounded slide and connected to a hopper opening onto the conveyor. Insufficient supply of cookies or the reverse, an excessive packing or jamming, of the cookies respectively producing a deviation by the lack of or too many cookies relative to a reference height. The deviation is detected by a sensor connected to a speed control circuit for a variable speed motor for driving the conveyor.

The filler depositing station comprises a fixed stencil cylinder 9 having a horizontal axis perpendicular to the direction of displacement of the conveyors and bearing at each end against two bearing surfaces or supports fixed to the machine. The stencil cylinder 9 has stencil ports 10 aligned along a generatrice with a spacing corresponding to that of the rows of bottom cookies on which filler is to be deposited. The stencil cylinder 9 is limited at one of its ends by a bearing 11 and at the other end by a filler delivery tube or box 12 comprising a bearing 13. The delivery tube or box 12 is attached to the stencil cylinder 9 by an assembly of collars and hinged bolts 14 permitting quick disassembly for cleaning the filler delivery assembly.

Coaxially of and inside the stencil cylinder 9 is mounted a valve member 15 mounted in bearings 11 and 13. A predetermined limited magnitude of angular displacement of the valve member 15 stops the delivery of filler. The valve member 15 is of one-piece construction and comprises a cylindrical central portion or body 15a fitted in the bore of the stencil cylinder 9. The central portion or body 15a is extended toward the delivery tube or box 12 by a hollow shaft 15b journaled in bearing 13 and to the other side by a shaft 15f journaled in a bearing 11 located at the end remote from the delivery tube or box 12. The bore in the hollow shaft 15b is a continuation of the axial bore 15d in the central portion or body 15a of the valve member which is connected by a radial channel 15e to open on the outer cylindrical surface of the central portion 15a. The shape and dimensions of the cross section of the radial channel 15e are identical to those of the ports 10 in the stencil cylinder 9.

The free end of the hollow shaft 15b journaled in the bearing 13 of the delivery tube or box 12 is in communication with a first inlet 16 for filler flowing axially of the delivery tube or box 12 through a flexible connecting hose 17. Bearing 13 is provided with an annular seal 13a. A second, inclined filler, inlet 18 disposed on the delivery tube or box 12 is also connected by a flexible hose for communication with a separate supply of filler. Filler from this second filler inlet 18 flows into the annular space included between the bore of the stencil cylinder 9 and the hollow shaft 15d of the valve member 15. Thos annular space supplies the port 10 closest to the delivery tube or box 12.

The outer cylindrical surface of the central portion or body 15a of the valve member 15 comprises an annular seal 19 preventing the leakage of filler to the port 10 remote from the delivery tube or box 12. This remote port 10 is supplied by the radial channel 15e in the central portion 15a of the valve member 15. In addition an annular seal 20 prevents any leaking of filler to the annular spaced 21 beyond the central portion 15a between the bore of the stencil cylinder 9 and the driving shaft 15f of the valve member 15. The central portion or body 15a carries on its front end facing the delivery tube or box 12 a cylindrical segment 15g the circumferential length of which is calculated to close off the port 10 closest to the delivery tube or box 12.

The simultaneous closing of the two ports 10 is obtained by a limited angular movement of the valve member by means of a pneumatic cylinder 22 cooperating with an arm 23 mounted at the end of the shaft 15f, the pneumatic cylinder 22 being controlled by the starting and stopping of the machine.

A rotational stencil or depositor 24 mounted coaxially of the stencil cylinder 9 comprises along a plurality of generatrices equidistant outlet orifices or nozzles 25 whose spacing is equal to that of the ports 10 in the stencil cylinder 9. The rotation of the rotational stencil 24 brings the ports 10 and nozzles 25 into communication with one another. Annular seals 26 prevent any leakage of filler between the outer surface of the stencil cylinder 9 and the rotational stencil 24.

The rotational stencil is coupled at one of its ends to a cylindrical sleeve 27 and at the other end to a cylindrical drive sleeve 28 carrying a sprocket 29 meshing with a transmission chain for driving the conveyors from the speed reduction gear 4. This arrangement permits synchronization of the speed of rotation of the rotational stencil or depositor 24 and the speed of displacement of the cookies. The synchronizing arrangement is associated with a known type of device for adjusting the filler depositing with respect to the cookies. The sleeves 27 and 28 are journaled on wear bushes 30 of polyethylene or polypropylene interposed between the stencil cylinder 9 and the rotational stencil 24.

The filler inlets 16 and 18 are fed with filler by means of volumetric pumps or lobe pumps 31 and 32 the rotational speed of which is synchronized with the speed of translation of the chains 1 of the conveyors. The mechanical connection between the pumps 31 and 32 and the speed reduction gear 4 driving the conveyors comprises clutches 33 associated with a speed change device 34. The clutches 33 permit on starting the machine the operation of only the pumps 31 and 32 while the chains 1 of the conveyors are at a standstill until a sufficient flow of filler is established at the outlet orifices or nozzles 25 of the rotational stencil 24. The speed change device 34 enables the adjustment of the flow rate of filler relative to the rate of displacement of the cookies in the course of normal operation of the machine.

FIG. 3 illustrates schematic diagram of the control system for maintaining the filler pressure at the admission side of the pumps 31 and 32 constant. This schematic diagram includes an assembly of the devices and circuit lines for supplying the stencil cylinder 9 of the filler depositing station 7 with ham or creme. The asembly comprises a hopper 33 containing the filler which is removed from the lower end by a discharge pump 34 in association with a membrane-type pressure regulator 35 which also functions as a pressure accumulator in association with a mixer 36 in the case of jam or a storage tank 37 in the case of creme. Flavoring line 38 and acid line 39 are connected to the mixer 36 and the flavoring and acid are pumped by a metering pump 40 across check valves 41 and 42. The metering pump 40 is driven off pumps 31 and 32.

Three-way valves 43 and 44 permit the supply of the stencil cylinder 9 with creme or jam.

The displacements of the membrane of the pressure regulator 35 controls variations in speed or the stopping of the discharge pump 34 as well as the stopping of the pump 31 or 32. To this end the membrane is secured to a sliding rod 45 carrying cursor or actuator which cooperates with electrical control contacts or switches during its displacement. Thus, an increase of pressure below the membrane causes the membrane to deform upwardly and forces the rod 45 to rise, the cursor acts on a control contact to slow the rotational speed of the discharge pump 34, the speed slowing contact is maintained operative by a permanent magnet along as the rod continues to rise. In case of an excessive overpressure causing a considerable rise of the rod 45, the cursor engages another contact which controls the stopping of the discharge pump 34, contact is broken as soon as the rod 45 descends. Conversely, a drop in pressure below the membrane causes it to deform downwardly. The cursor on the rod 45 controls an increase in the rotational speed of the discharge pump 34 by maintaining contact during the descent of the rod. When the fall in pressure becomes more marked the cursor comes into engagement with a contact stopping the pumps 31 and 32.

The invention is not intended to be limited to the particularly described and illustrated embodiment, but encompasses all possible variations and alternatives understood to those skilled in the art without departing from the scope of the invention defined by the appended claims.

The machine according to the invention may be used for making various goods where a filler or the like is deposited on an element.

What is claimed is:

1. A machine for preparing elements with a layer of filler thereon, said machine comprising conveyors each serving a station for supplying bottom elements and a filler depositing station, rotational drive means for said conveyors, the filler depositing station comprising a fixed stencil cylinder having longitudinally spaced apart stencil ports, a valve member coaxially received in said stencil cylinder, a pneumatic cylinder for imparting angular movement to the value member for controlling the same, said pneumatic cylinder being responsive to the starting and stopping of said machine, said valve member selectively closing off said ports in said stencil cylinder and bringing them into communication with orifices in a rotational stencil surrounding said stencil cylinder, means for rotating said rotational stencil for bringing said orifices in said rotational stencil into registry with the ports in said stencil cylinder, the improvement comprising:

two independent filler feed inlets opening into said rotational stencil at longitudinally spaced intervals corresponding to the distance between the ports in said fixed stencil, volumetric pumps for delivering filler to said filler feed inlets, means for synchronizing said volumetric pumps with said rotational drive means for said conveyors, means for independently driving said pumps when said conveyors are stopped or driven at a speed lower than a predetermined speed, and means for regulating the supply of filler to said volumetric pumps.

2. The machine of claim 1, wherein one end of said stencil cylinder terminates in a filler delivery box, said valve member comprising a body having an axial bore connected to a radial channel which communicates with the port in said stencil cylinder remote from said delivery box when said valve member is in its open position, the size and shape of the cross-section of said radial channel being the same as that of said port remote from said delivery box, a hollow shaft extending through said delivery box and communicating with said axial bore in said valve member body and with one of said filler feed inlets.

3. The machine of claim 2, wherein the other of said filler feed inlets opens into the annular space included between the bore of said stencil cylinder and said hollow shaft extending from said valve body member, said annular space communicating with the port in said stencil cylinder adjacent to said delivery box.

4. The machine of claims 2 or 3, wherein sealing means is provided on said valve body member for preventing communication between said ports in said stencil cylinder.

5. The machine of claim 4, wherein said delivery box forms a bearing for said hollow shaft, said bearing also defining said first filler feed inlet, and sealing means between said bearing and said hollow shaft.

6. The machine of claim 4, wherein a cylindrical segment is provided on said valve member body on the delivery box side thereof, the circumferential length of said cylindrical segment being selected so that said cylindrical segment closes off the port in said stencil cylinder adjacent to said delivery box in a predetermined angular position of said valve member in said stencil cylinder.

7. The machine of claim 1, wherein said synchronizing means comprises a mechanical connection between said volumetric pumps and said rotational drive means for said conveyors including clutches associated with a speed change device.

8. The machine of claim 1, wherein said means for regulating the supply of filler to the admission sides of said volumetric pumps comprises for each volumetric pump a pressure regulator having a membrane and operating as a pressure accumulator, said pressure regulator being disposed between a discharge pump associated with a hopper and said associated volumetric pump, means mounted for movement with said membrane of said pressure regulator for selectively controlling the speed of said discharge pump, stopping said discharge pump and stopping said associated volumetric pump.

9. The machine of claim 8, wherein said means mounted for movement with said membrane comprises a translatory rod fixed to said membrane and carrying actuating means cooperable with switch means electrically connected to said discharge pump and said associated volumetric pump respectively, magnetic means for maintaining said switch means in a first state during further translation of said rod in a given direction, said actuating means bringing said switch means to a second state upon a subsequent reversal in direction of said rod.

10. The machine of claim 8 or 9, wherein said means for regulating the supply of filler to the admission side of said volumetric pumps further comprises a tank for constantly force-feeding filler to said volumetric pumps, said tank being disposed in a line connected between said pressure regulator and said volumetric pumps.

11. The machine of claim 4, wherein said valve member is of one-piece construction and comprises a shaft journaled in a bearing at the end of said stencil cylinder remote from said delivery box.

12. A sandwiching machine as claimed in claim 1, including a station for supplying top elements to be received on top of the bottom elements on which filler has been deposited.

* * * * *